US012604238B2

(12) United States Patent
Truong Van et al.

(10) Patent No.: US 12,604,238 B2
(45) Date of Patent: Apr. 14, 2026

(54) METHOD AND APPARATUS FOR SUPPORTING NEW SERVICE IN WIRELESS COMMUNICATION SYSTEM

(71) Applicant: Samsung Electronics Co., Ltd., Suwon-si (KR)

(72) Inventors: Hau Truong Van, Hanoi City (VN); Nam Ta Phuong, Hanoi City (VN); Thinh Nguyen Van, Hanoi City (VN); Duc Hoang Minh, Hanoi City (VN); Thoi Nguyen The, Hanoi City (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 18/356,411

(22) Filed: Jul. 21, 2023

(65) Prior Publication Data

US 2024/0064578 A1 Feb. 22, 2024

(30) Foreign Application Priority Data

Aug. 16, 2022 (KR) ........................ 10-2022-0102113

(51) Int. Cl.
*H04W 36/00* (2009.01)
*H04W 36/30* (2009.01)
(52) U.S. Cl.
CPC ... *H04W 36/0022* (2013.01); *H04W 36/0058* (2018.08); *H04W 36/302* (2023.05)
(58) Field of Classification Search
CPC ......... H04W 36/0022; H04W 36/0058; H04W 36/302; H04W 36/1443; H04W 36/0222; H04W 40/242; H04W 36/00224; H04W 36/00; H04W 72/56
See application file for complete search history.

(56) References Cited

U.S. PATENT DOCUMENTS

| | | | | |
|---|---|---|---|---|
| 7,245,913 B1 * | 7/2007 | Nguyen | ................ | H04W 88/06 |
| | | | | 455/428 |
| 9,560,563 B2 | 1/2017 | Kim et al. | | |
| 2015/0094069 A1 * | 4/2015 | Gopal | ................... | H04W 36/08 |
| | | | | 455/437 |
| 2015/0327125 A1 * | 11/2015 | Lindoff | ................ | H04W 48/18 |
| | | | | 455/437 |
| 2020/0252839 A1 | 8/2020 | Tang | | |
| 2021/0007026 A1 | 1/2021 | Kho et al. | | |
| 2021/0105691 A1 * | 4/2021 | Zhu | ........................ | H04W 84/12 |
| 2022/0248274 A1 * | 8/2022 | Singh | .................... | H04W 76/18 |

FOREIGN PATENT DOCUMENTS

| | | |
|---|---|---|
| CA | 2811727 C | 2/2019 |
| EP | 2296339 B1 | 4/2014 |
| JP | 2014183377 A | 9/2014 |

* cited by examiner

*Primary Examiner* — Marcus Smith
*Assistant Examiner* — Shivakrishna Vallamdasu
(74) *Attorney, Agent, or Firm* — Nixon & Vanderhye P.C.

(57) ABSTRACT

An operation for supporting a service in a wireless communication system. The operation may include receiving a request for a second service by a terminal/UE performing a first service in a first radio access technology (RAT), identifying at least one RAT capable of supporting the second service from a database including service support information in case that the first RAT is unable to perform the second service, performing handover to a second RAT included in the at least one RAT, and performing the second service in the second RAT.

14 Claims, 16 Drawing Sheets

Receive request for
new service
(e.g., RSSD or SMS)

Support for USSD or SMS service
is not possible during calls via VoNR service

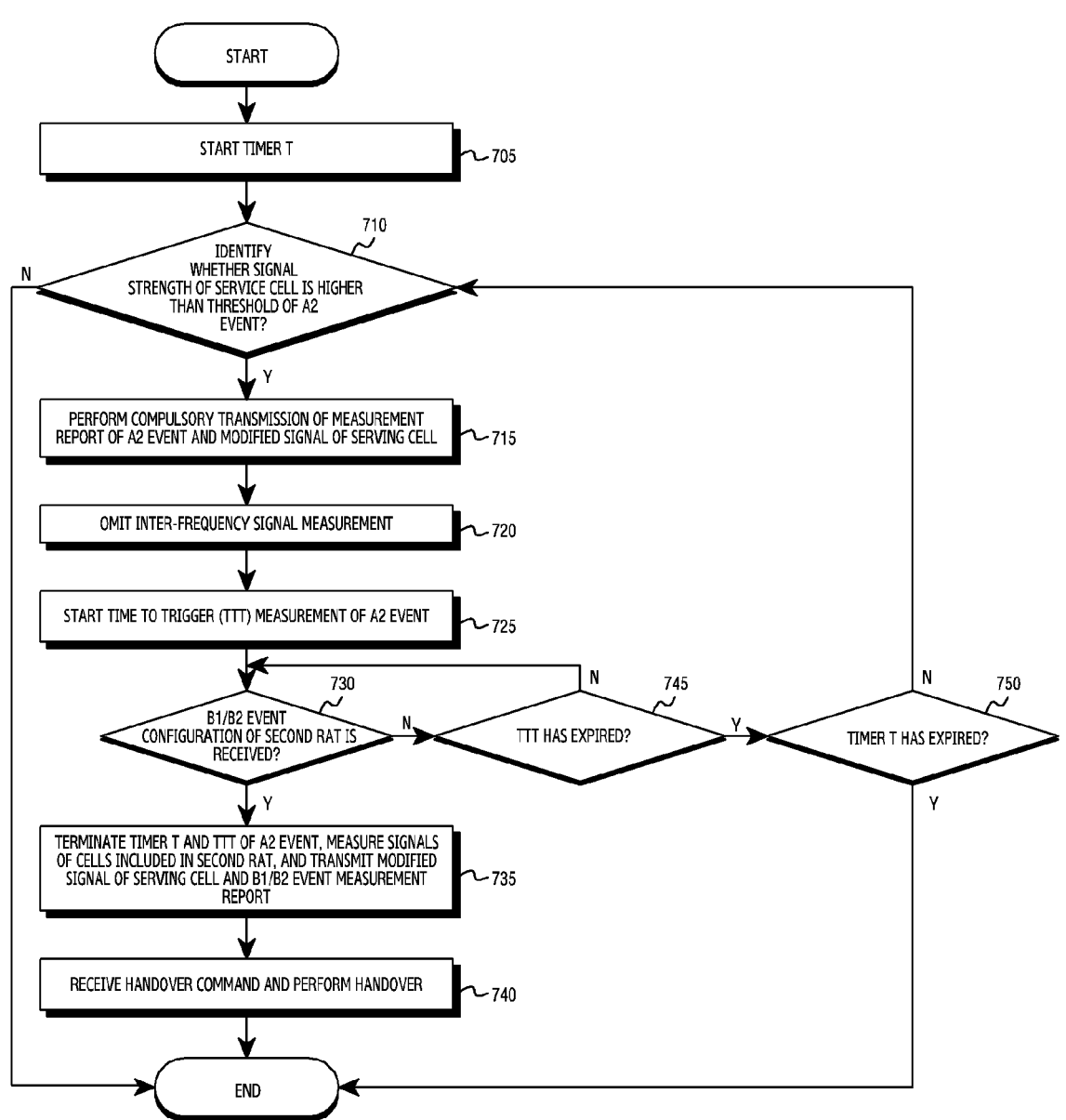

START

START TIMER T 〜705

IDENTIFY WHETHER SIGNAL STRENGTH OF SERVICE CELL IS HIGHER THAN THRESHOLD OF A2 EVENT? 〜710

N

Y

PERFORM COMPULSORY TRANSMISSION OF MEASUREMENT REPORT OF A2 EVENT AND MODIFIED SIGNAL OF SERVING CELL 〜715

OMIT INTER-FREQUENCY SIGNAL MEASUREMENT 〜720

START TIME TO TRIGGER (TTT) MEASUREMENT OF A2 EVENT 〜725

B1/B2 EVENT CONFIGURATION OF SECOND RAT IS RECEIVED? 〜730

N

N    TTT HAS EXPIRED? 〜745    Y

N    TIMER T HAS EXPIRED? 〜750

Y

Y

TERMINATE TIMER T AND TTT OF A2 EVENT, MEASURE SIGNALS OF CELLS INCLUDED IN SECOND RAT, AND TRANSMIT MODIFIED SIGNAL OF SERVING CELL AND B1/B2 EVENT MEASUREMENT REPORT 〜735

RECEIVE HANDOVER COMMAND AND PERFORM HANDOVER 〜740

END

FIG.7

METHOD AND APPARATUS FOR SUPPORTING NEW SERVICE IN WIRELESS COMMUNICATION SYSTEM

CROSS-REFERENCE TO RELATED APPLICATION(S)

This application is based on and claims priority under 35 U.S.C. 119 to Korean Patent Application No. 10-2022-0102113, filed on Aug. 16, 2022, in the Korean Intellectual Property Office, the disclosure of which is herein incorporated by reference in its entirety.

BACKGROUND

1) Field

Certain example embodiments relate generally to a wireless communication system and, for example, to a method and/or an apparatus for supporting a requested service in a wireless communication system.

2) Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed. With the advance of wireless communication systems as described above, various services can be provided, and accordingly there is a need for schemes to smoothly provide these services. In particular, there is a need for a technology to support services newly requested in a wireless communication system.

The above information is presented merely as background information to help an understanding of the disclosure. No determination has been made and no assertion is made as to whether any of the above might be applicable as prior art with regard to the disclosure.

SUMMARY

Certain example embodiments provide an apparatus and/ or a method capable of effectively providing a newly requested service in a wireless communication system.

According to various example embodiments, provided is a method for operating a terminal and/or user equipment (UE) in a wireless communication system, where the method may include receiving a request for a second service by the terminal performing a first service in a first radio access technology (RAT), identifying one or more RATs capable of supporting the second service from a database including service support information in case that the first RAT is unable to perform the second service, performing handover to a second RAT included in the one or more RATs, and performing the second service in the second RAT.

According to various example embodiments, provided is a terminal/UE in a wireless communication system, where the terminal/UE may include a communication unit (e.g., transceiver comprising communication circuitry), a memory, and a controller (e.g., at least one processor), wherein the controller may be configured to perform control to receive a request for a second service by the terminal performing a first service in a first radio access technology (RAT), identify one or more RATs capable of supporting the second service from a database including service support information in case that the first RAT is unable to perform the second service, perform handover to a second RAT included in the one or more RATs, and perform the second service in the second RAT.

Certain example embodiments provide an apparatus and/ or a method capable of effectively providing a service in a wireless communication system.

BRIEF DESCRIPTION OF THE DRAWINGS

The above and other aspects, features, and advantages of certain example embodiments will be more apparent from the following description taken in conjunction with the accompanying drawings, in which:

FIG. 7 illustrates an embodiment of an active handover procedure according to various example embodiments;

DETAILED DESCRIPTION

Figure 1:
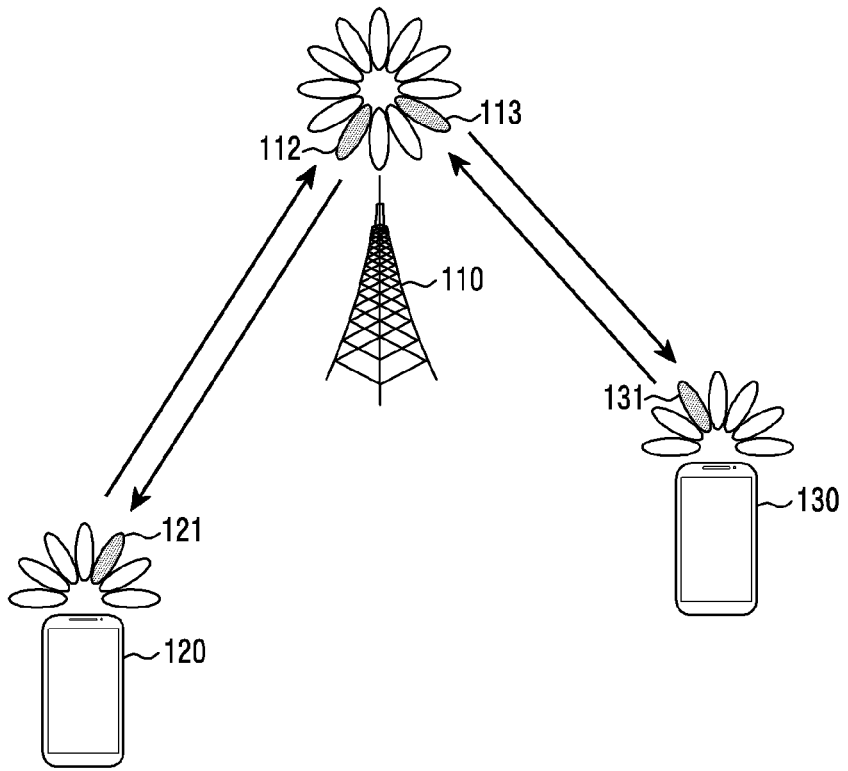
FIG. 1 illustrates a wireless communication system according to various example embodiments.

Hereinafter, certain example embodiments will be described in detail with reference to the accompanying drawings.

In describing the embodiments, descriptions related to technical contents well-known in the art and not associated directly with the disclosure will be omitted. Such an omission of unnecessary descriptions is intended to prevent or reduce obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit comprising circuitry, a base station controller comprising circuitry, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the example embodiments may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the example embodiments may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

An apparatus and a method according to various example embodiments allow an inter-radio access technology (RAT) handover and thus enable services not supported by a 5G standalone (SA) network to be simultaneously performed with a VoNR service.

FIG. 1 illustrates a wireless communication system according to various example embodiments. FIG. 1 illustrates a base station 110, a terminal/UE 120, and a terminal/UE 130, as parts of nodes using a radio channel in a wireless communication system. FIG. 1 illustrates only one base station, but may further include another base station that is the same as or similar to the base station 110. In this disclosure, terminal 120 may be referred to interchangeably with user equipment (UE).

The base station 110 is a network infrastructure that provides wireless access to the terminals 120 and 130. The base station 110 has coverage defined to be a predetermined geographic area based on the distance over which a signal may be transmitted. The base station 110 may be referred to as "access point (AP)", "evolved NodeB (eNodeB) (eNB)", "5th generation node (5G node)", "next generation NodeB (gNB)", "wireless point", "transmission/reception point (TRP)" in addition to "base station", or other terms having equivalent technical meanings.

Each of the terminal 120 and the terminal 130 is a device used by a user, and performs communication with the base station 110 via the radio channel. In some cases, at least one of the terminal 120 and the terminal 130 may be operated without involvement of a user. That is, at least one of the terminal 120 and the terminal 130 is a device that performs machine type communication (MTC) and may not be carried by a user. Each of the terminal 120 and the terminal 130 may be referred to as "user equipment (UE)", "mobile station", "subscriber station", "remote terminal", "wireless terminal", "mobile phone", "user device" in addition to "terminal", or other terms having equivalent technical meanings.

The base station 110, the terminal 120, and the terminal 130 may transmit and receive radio signals in a mmWave band (e.g., 28 GHz, 30 GHz, 38 GHz, and 60 GHz)). Here, in order to improve a channel gain, the base station 110, the terminal 120, and the terminal 130 may perform beamforming. The beamforming may include transmission beamforming and reception beamforming. That is, the base station 110, the terminal 120, and the terminal 130 may assign a directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in quasi co-located (QCL) relationship with resources via which the serving beams 112, 113, 121, and 131 are transmitted.

When large-scale characteristics of a channel, via which a symbol on a first antenna port has been transferred, may be inferred from a channel via which a symbol on a second antenna port has been transferred, it may be evaluated that the first antenna port and the second antenna port are in a QCL relationship. For example, the large-scale characteristics may include at least one among a delay spread, a doppler spread, a doppler shift, an average gain, an average delay, and a spatial receiver parameter.

Figure 2:
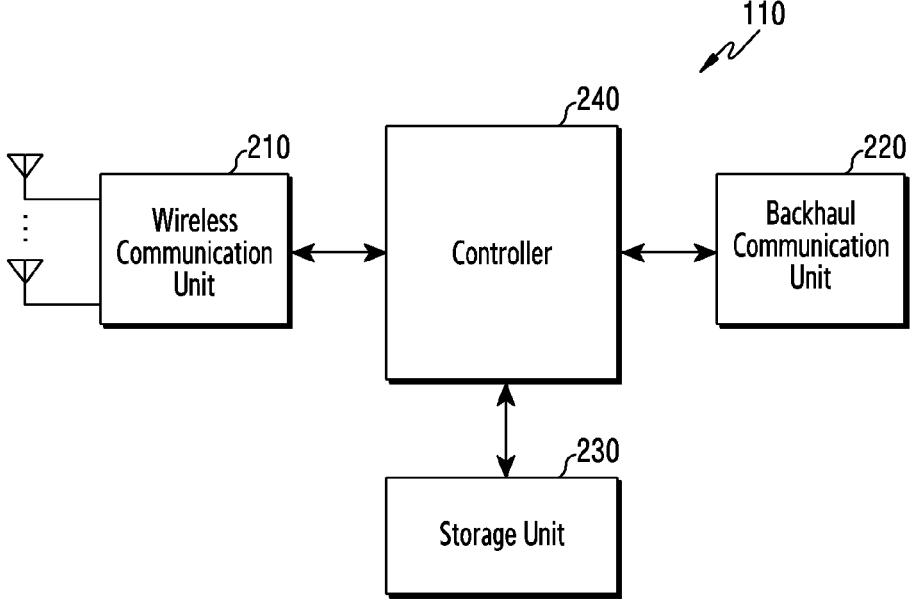
FIG. 2 illustrates a configuration of a base station in a wireless communication system according to various example embodiments.

FIG. 2 illustrates a configuration of a base station in the wireless communication system according to various example embodiments. The configuration illustrated in FIG. 2 may be understood as the configuration of the base station 110. The terms such as "~ unit", "~ device", "~ er", "~ or", etc. used hereinafter refer to a unit that processes at least one function or operation, which may be implemented by hardware or software, or a combination of hardware and software.

Referring to FIG. 2, the base station includes a wireless communication unit 210, a backhaul communication unit 220, a storage unit 230, and a controller 240.

The wireless communication unit 210 performs functions for transmitting or receiving signals through a radio channel. For example, the wireless communication unit 210 performs a conversion function between a baseband signal and a bit string according to the physical layer standard of a system. For example, during data transmission, the wireless communication unit 210 generates complex symbols by encoding and modulating a transmission bit stream. In addition, during data reception, the wireless communication unit 210 reconstructs the received bit string through demodulation and decoding of the baseband signal.

In addition, the wireless communication unit 210 (which may comprise communication circuitry) up-converts the baseband signal into a radio frequency (RF) band signal and then transmits the RF band signal through an antenna, and down-converts an RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include multiple transmission and reception paths. Furthermore, the wireless communication unit 210 may include at least one antenna array including multiple antenna elements.

In terms of hardware, the wireless communication unit 210 may include a digital unit and an analog unit, and the analog unit may include multiple sub-units according to operating power, operating frequency, and the like. The digital unit may be implemented with at least one processor (e.g., a digital signal processor (DSP)).

The wireless communication unit 210 transmits or receives a signal as described above. Accordingly, all or a part of the wireless communication unit 210 may be referred to as "a transmitter", "a receiver", or "a transceiver". In the following description, transmission and reception performed via a radio channel are used in a meaning including processing performed as described above by the wireless communication unit 210.

The backhaul communication unit 220 (which may comprise communication circuitry) provides an interface to perform communication with other nodes within the network. That is, the backhaul communication unit 220 converts, into a physical signal, a bit stream transmitted from the base station to another node, for example, another access node, another base station, a higher node, a core network, etc., and converts a physical signal received from another node into a bit stream.

The storage unit 230 stores data, such as a basic program, an application program, and configuration information for operations of the base station. The storage unit 230 may include a volatile memory, a nonvolatile memory, or a combination of a volatile memory and a nonvolatile memory. The storage unit 230 provides stored data in response to a request of the controller 240.

The controller 240, which may comprise at least one processor comprising processing circuitry, may control overall operations of the base station. For example, the controller 240 transmits or receives a signal via the wireless communication unit 210 or backhaul communication unit 220. Further, the controller 240 records and reads data in the storage unit 230. In addition, the controller 240 may perform functions of a protocol stack required by the communication standard. According to another implementation example, the protocol stack may be included in the wireless communication unit 210. To this end, the controller 240 may include at least one processor.

According to various embodiments, the controller 240 may control the base station to perform operations based on the various embodiments described below.

Figure 3:
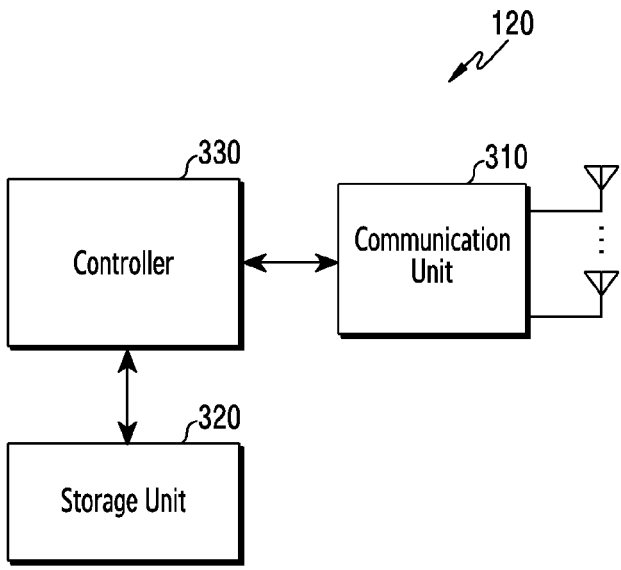
FIG. 3 illustrates a configuration of a user equipment (UE)/terminal in a wireless communication system according to various example embodiments.

FIG. 3 illustrates a configuration of a terminal in the wireless communication system according to various example embodiments. The configuration illustrated in FIG. 3 may be understood as the configuration of the terminal 120. The terms such as "~ unit", "~ device", "~ er", "~ or", etc. used hereinafter refer to a unit that processes at least one function or operation, which may be implemented by hardware or software, or a combination of hardware and software.

Referring to FIG. 3, the terminal includes a communication unit 310, a storage unit 320, and a controller 330.

The communication unit 310 (which may comprise communication circuitry) performs functions for transmitting or receiving a signal via a radio channel. For example, the communication unit 310 performs a conversion function between a baseband signal and a bit string according to the physical layer standard of a system. For example, during data transmission, the communication unit 310 generates complex symbols by encoding and modulating a transmission bit stream. In addition, during data reception, the communication unit 310 reconstructs the received bit string through demodulation and decoding of the baseband signal. In addition, the communication unit 310 up-converts the baseband signal into a radio frequency (RF) band signal and then transmits the RF band signal through an antenna, and down-converts an RF band signal received through the antenna into a baseband signal. For example, the communication unit 310 may include a transmission filter, a reception filter, an amplifier, a mixer, an oscillator, a DAC, an ADC, and the like.

In addition, the communication unit 310 may include multiple transmission and reception paths. Furthermore, the communication unit 310 may include at least one antenna array including multiple antenna elements. In terms of hardware, the communication unit 310 may include a digital circuit and an analog circuit (e.g., radio frequency integrated circuit (RFIC)). Here, the digital circuit and the analog circuit may be implemented in a single package. Further, the communication unit 310 may include multiple RF chains. Furthermore, the communication unit 310 may perform beamforming.

The communication unit 310 transmits or receives a signal as described above. Accordingly, all or a part of the communication unit 310 may be referred to as "a transmitter", "a receiver", or "a transceiver". In the following description, transmission and reception performed via a radio channel are used in a meaning including processing performed as described above by the communication unit 310.

The storage unit 320 stores data, such as a basic program, an application program, and configuration information for operations of a terminal. The storage unit 320 may include a volatile memory, a nonvolatile memory, or a combination of a volatile memory and a nonvolatile memory. The storage unit 320 provides stored data in response to a request of the controller 330.

The controller 330, which may comprise at least one processor comprising processing circuitry, may control overall operations of the terminal. For example, the controller 330 transmits or receives a signal via the communication unit 310. Further, the controller 330 records and reads data in the storage unit 320. In addition, the controller 330 may perform functions of a protocol stack required by the communication standard. To this end, the controller 330 may include at least one processor or microprocessor, or may be a part of the processor. In addition, a part of the communication unit 310 and the controller 330 may be referred to as a communication processor (CP).

According to various embodiments, the controller 330 may control a terminal to perform operations based on various embodiments described below.

Figure 4:
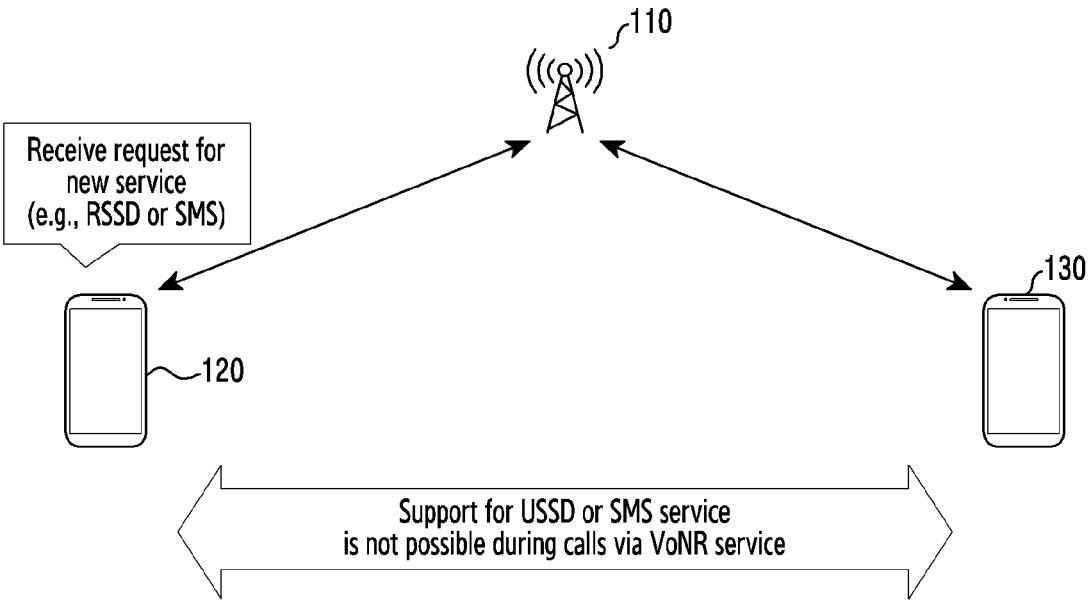
FIG. 4 illustrates a service providing form in a 5G SA network environment according to various example embodiments.

FIG. 4 illustrates a service providing form in a 5G SA network environment according to various example embodiments.

Referring to FIG. 4, base station 110 may correspond to a base station constituting a 5G SA network. The base station 110 may provide a voice over new radio (VoNR) service between the terminal 120 and the terminal 130. The VoNR service may be a technology that supports both voice calls and data using a 5G SA network. Hereinafter, a service performed in 5G SA will be described using VoNR service as an example. However, the service performed in 5G SA is not limited thereto and may include various services.

However, in case that there is a request for a service not supported by the 5G SA network (e.g., unstructured supplementary service data (USSD) or short message service (SMS)) while the base station 110 constituting the 5G SA network provides a VoNR service between the terminal 120 and the terminal 130, it may be difficult to simultaneously provide the VoNR service and the requested service. In the following embodiments, a service for which the terminal 120 is newly requested to provide may be a service such as USSD or SMS not supported by the 5G SA network.

Figure 5:
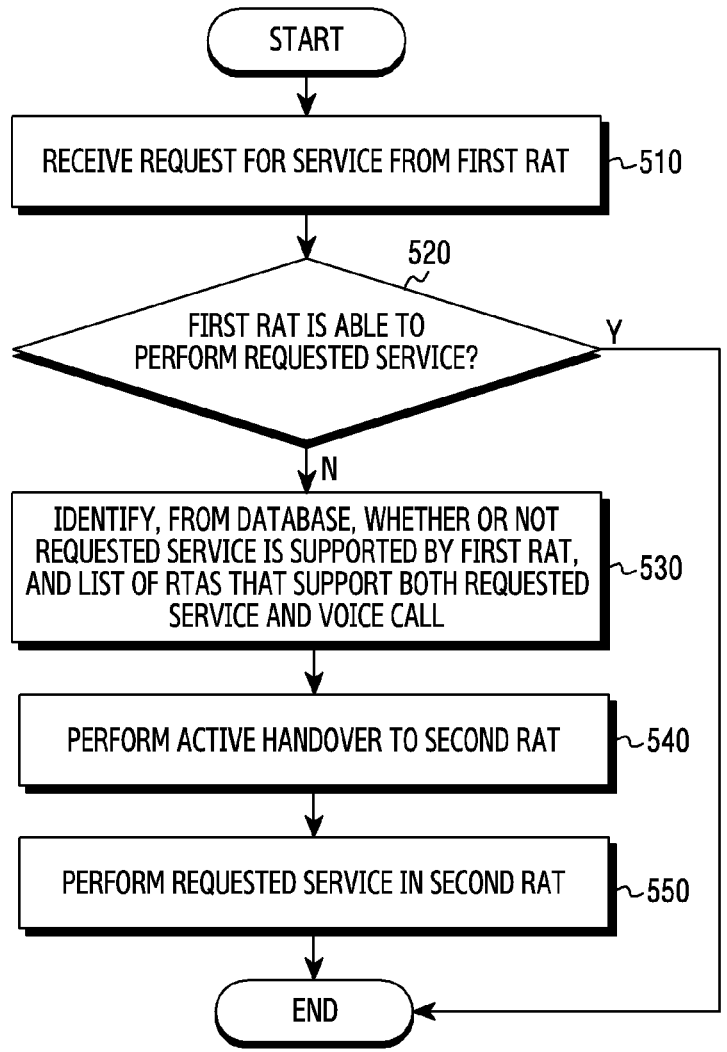
FIG. 5 illustrates an embodiment for providing a service not supported by a 5G SA network according to various example embodiments.

FIG. 5 illustrates an embodiment for providing a service not supported by a 5G SA network according to various example embodiments.

Referring to FIG. 5, in case that there is a request for a service not supported by the 5G SA network while the terminal 120 is using VoNR service in a first RAT, a procedure of handover of the terminal 120 to a second RAT capable of supporting the requested service may be discussed in order to provide the requested service. In operation 510, the terminal 120 may receive a request for another service (e.g., USSD or SMS) while using the VoNR service from the first RAT.

In operation 520, the terminal 120 may be configured to identify whether the newly requested service is a service that the first RAT is able to provide. Whether the service is supported by the first RAT may be determined based on information included in a database stored in the terminal 120.

In an embodiment, service support information may include one or more of a mobile country code (MCC), a mobile network code (MNC), a service name, a domain (network access server (NAS) and over-Internet protocol (IP)), support information, and priority information, and may be represented as shown in Table 1 below.

TABLE 1

| | | USSD | | | SMS | | | |
| | | NAS | | Over IP | | NAS | | Over IP | |
| | RAT | Priority | Supported or not | Priority | Supported or not | Priority | Supported or not | Priority | Supported or not |
| --- | --- | --- | --- | --- | --- | --- | --- | --- | --- |
| MCC/MNC | 5G | — | N | — | N | — | N | — | N |
| | 4G | — | N | 1 | Y | 3 | Y | 2 | Y |
| | 3G | 3 | Y | 2 | Y | 1 | Y | — | N |

The priority information may be information allocated to each RAT in order to select an optimal RAT to trigger a newly requested service in case that there are multiple RATs capable of supporting the requested service. The priority information may be determined based on one of information preconfigured in the terminal 120 or information of one or more RATs connected, directly or indirectly, to the first RAT before.

A database stored in the terminal 120 may be preconfigured in the terminal 120 or may be configured by signaling (e.g., radio resource control (RRC) message) received from the base station. The database may be periodically updated by a base station. Alternatively, the terminal 120 may transmit a message requesting an update to the base station to update the database.

In operation 530, when it is determined that the first RAT is unable to perform the newly requested service, the terminal 120 may be configured to identify an RAT capable of supporting the newly requested service, that is, a second RAT. Here, the terminal 120 may be configured to identify the second RAT based on a database stored in the terminal 120. In an embodiment, the terminal 120 may be configured to identify one or more RATs (3G or 4G networks) that may support both a newly requested service and a voice call service (e.g., voice over LTE (VoLTE) or circuit service (CS) calls). In case that the terminal 120 performs handover to a RAT capable of supporting both the newly requested service and the voice call service, the terminal may continue to provide the currently performed voice call service while providing the newly requested service.

In operation 540, the terminal 120 may perform handover to a RAT capable of supporting the newly requested service, that is, a second RAT. In an embodiment, the terminal 120 may perform handover to one RAT (e.g., the second RAT) among one or more RATs capable of supporting both the newly requested service and the voice call service. Handover to the second RAT may refer to active handover, and a detailed operation of active handover will be described in FIG. 7 below.

In operation 550, the terminal 120 may perform the newly requested service and voice call service in the second RAT to which handover is performed. Here, the VoNR service being performed in the first RAT may be converted to a voice call service (e.g., VoLTE or CS call) supported by the second RAT.

Figure 6:
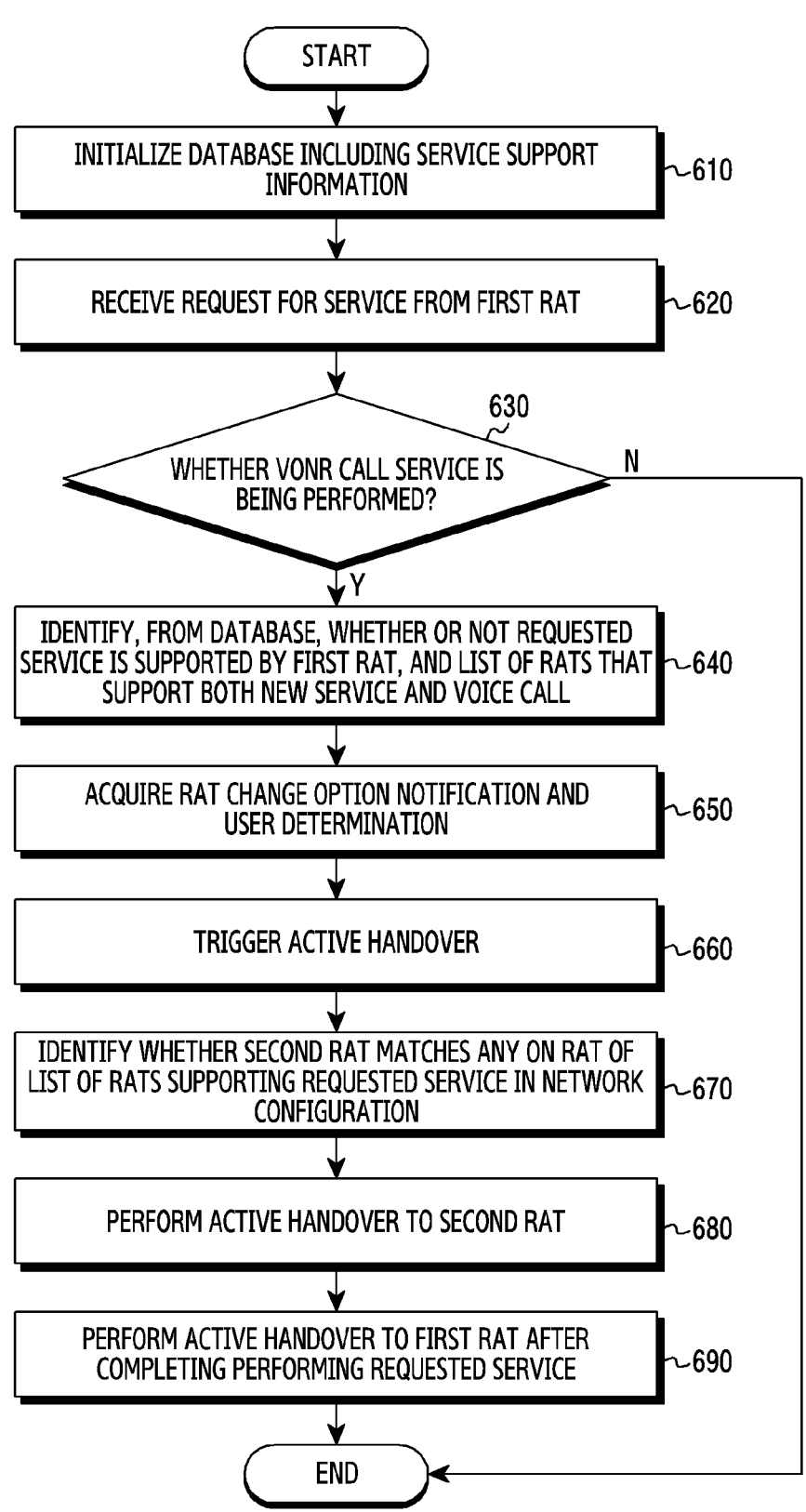
FIG. 6 illustrates an improved embodiment for providing a service not supported by a 5G SA network according to various example embodiments.

FIG. 6 illustrates an improved embodiment for providing a service not supported by a 5G SA network according to various example embodiments.

Hereinafter, contents overlapping with those described in FIG. 5 will be briefly described.

Referring to FIG. 6, in operation 610, the terminal 120 may initialize database including service support information.

In operation 620, the terminal 120 may receive a request for another service (e.g., USSD or SMS) service from a first RAT.

In operation 630 and 640, the terminal 120 may be configured to identify whether or not preceding conditions are satisfied. Preceding conditions may be included in a database stored in the terminal 120, and may include multiple conditions as follows.

In case that a terminal is using a VoNR service in the first RAT

In case that the first RAT does not support the requested service or fails to connection In case that there is a RAT that supports both voice call and requested service The terminal 120 may be configured to identify one or more RATs supporting both the voice call and the requested service from the database. One or more RATs supporting both the voice call and the requested service may be candidate RATs to which the terminal 120 performs handover. In case that all of the above-mentioned preceding conditions are not satisfied, the procedure for performing the request for service having been received in operation 610 may be terminated.

In operation 650, when all of the above-mentioned preceding conditions are satisfied, the terminal 120 may notify a user of an option capable of changing the RAT. For example, since the current network does not support SMS for a user, the terminal 120 may display a notification message allowing the user to select whether to change to an LTE network that supports SMS, and the user may select whether to change to the LTE network. The terminal 120 may receive a user's selection regarding whether or not to change the RAT. The aforementioned RAT may be one of a 3G or 4G network capable of supporting services not supported by the first RAT.

In operation 660, when the user selects RAT change, the terminal 120 may trigger active handover. The terminal 120 may be configured to determine an optimal candidate RAT for handover among one or more candidate RATs based on priority information included in the database.

In operation 670, the terminal 120 may be configured to identify whether the optimal candidate RAT, having been determined in operation 640, matches any one of one or more candidate RATs. However, when the network redirects to a RAT that is not belonging to one or more candidate RATs, the terminal 120 may not hand over to the second RAT.

In operation 680, the terminal 120 may perform handover to a candidate RAT (e.g., the second RAT). After handing over to the second RAT, the terminal 120 may perform the requested service. The VoNR service may be converted to a voice call service (e.g., VoLTE or CS call) supported by the second RAT.

In operation 690, the terminal 120 may perform handover to the first RAT after completing performing the requested service in the second RAT. Handover in the above procedure may refer to active handover, and a detailed operation of active handover will be described below in FIG. 7.

FIG. 7 illustrates an embodiment of an active handover procedure according to various example embodiments.

Referring to FIG. 7, an active handover procedure from a first RAT to a second RAT (e.g., 3G or 4G network) may be described. Hereinafter, in case that a measurement report triggering event (e.g., A1, A2, A3, B1, or B2 event) is satisfied in the active handover procedure, the terminal 120 may transmit a measurement report. Here, A1 to A3 events may correspond to measurement report triggering events in an inter-frequency handover procedure. The A1 event may be an event reported when the signal strength of a serving cell is equal to or greater than a specific threshold. The A2 event may be an event reported when the signal strength of a serving cell is equal to or less than a specific threshold. The A3 event may be an event reported when the signal strength of a neighbor cell is greater than the signal strength of a serving cell by offset or more. Here, the B1 to B2 events may correspond to measurement report triggering events in an inter-RAT handover procedure. The B1 event may be an event reported when the strength of an inter-RAT signal from a neighbor RAT exceeds a specific threshold. The B2 event may be an event reported when the signal strength of a serving RAT is equal to or less than a first threshold and the signal strength of the neighbor RAT is equal to or greater than a second threshold. In the aforementioned measurement report triggering event, the specific, the first, and the second thresholds may be reference values of handover execution probabilities for measurement report transmission.

In operation 705, the terminal 120 may start a timer T. In operation 710, the terminal 120 may be configured to identify whether the signal strength of a serving cell is higher than a threshold of the A2 event. The terminal 120 may be configured not to perform active handover when the signal strength of the serving cell is lower than the threshold of the A2 event.

In operation 715, when the signal strength of the serving cell is higher than the threshold of the A2 event, the terminal 120 may transmit a measurement report of the A2 event together with a modified signal of the serving cell to the network. In operation 720, the terminal 120 may omit inter-frequency signal measurement.

In operation 725, the terminal 120 may a start time to trigger (TTT) measurement of the A2 event. In operation 730, the network may transmit B1 or B2 event configuration of the second RAT to the terminal 120. The terminal 120 may receive the B1 or B2 event configuration of the second RAT from the network. In operation 735, in the case of receiving the B1 or B2 event configuration of the second RAT, the terminal 120 may terminate the timer T and TTT measurement of the A2 event. The terminal 120 may measure cells included in the second RAT. In addition, the terminal 120 may transmit a modified signal of the serving cell and a measurement report of the B1 or B2 event to the network. The network may receive the modified signal of the serving cell and the measurement report of the B1 or B2 event from the terminal 120. In operation 740, the network may transmit a handover command to the terminal 120. The terminal 120 may receive a handover command from the network and perform handover to the second RAT according to the handover command.

In operation 745, in the case of not receiving the B1 or B2 event configuration of the second RAT from the network, the terminal 120 may be configured to identify whether the TTT has expired. When the TTT has not expired, the terminal 120 may return to operation 730 and receive the B1 or B2 event configuration of the second RAT from the network again. In operation 750, the terminal 120 may be configured to identify whether the timer T has expired in case that the TTT has expired. When the timer T has not expired, the terminal 120 may return to operation 710 and identify again whether the signal strength of the serving cell is higher than the threshold of the A2 event. When the timer T has expired, the terminal 120 may be configured not to perform handover.

Figure 8:
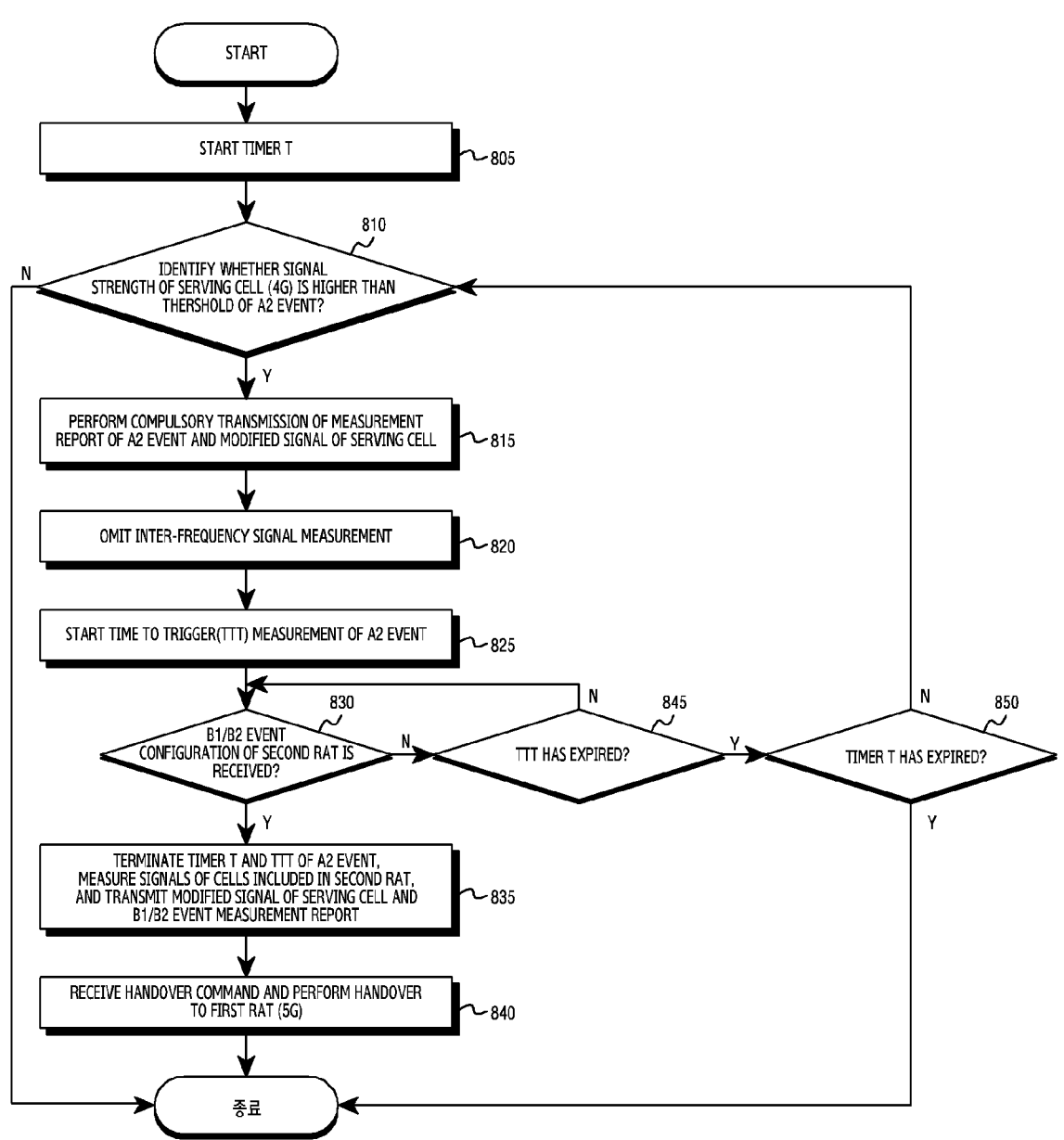
FIG. 8 illustrates an embodiment of an active handover procedure according to various example embodiments.

FIG. 8 illustrates an embodiment of an active handover procedure according to various example embodiments.

Hereinafter, contents overlapping with those described in FIG. 7 will be briefly described.

Referring to FIG. 8, an active handover procedure from a second RAT (e.g., 4G network) to a first RAT (e.g., 5G network) may be described.

In operation 805, the terminal 120 may start a timer T. In operation 810, the terminal 120 may be configured to identify whether the signal strength of a serving cell is higher than a threshold of the A2 event. The terminal 120 may be configured not to perform active handover when the signal strength of the serving cell is lower than the threshold of the A2 event. In operation 815, when the signal strength of the serving cell is higher than the threshold of the A2 event, the terminal 120 may transmit a measurement report of the A2 event together with a modified signal of the serving cell to the network. In operation 820, the terminal 120 may omit inter-frequency signal measurement.

In operation 825, the terminal 120 may a start time to trigger (TTT) measurement of the A2 event. In operation 830, the network may transmit B1 or B2 event configuration of the second RAT to the terminal 120. The terminal 120 may receive the B1 or B2 event configuration of the second RAT from the network. In operation 835, in the case of receiving the B1 or B2 event configuration of the second RAT, the terminal 120 may terminate the timer T and TTT measurement of the A2 event. The terminal 120 may measure cells included in the second RAT. In addition, the terminal 120 may transmit a modified signal of the serving cell and a measurement report of the B1 or B2 event to the network. The network may receive the modified signal of the serving cell and the measurement report of the B1 or B2 event from the terminal 120. In operation 840, the network may transmit a handover command to the terminal 120. The terminal 120 may receive a handover command from the network and perform handover to the first RAT according to the handover command.

In operation 845, in the case of not receiving the B1 or B2 event configuration of the second RAT from the network, the terminal 120 may be configured to identify whether the TTT has expired. When the TTT has not expired, the terminal 120 may return to operation 830 and receive the B1 or B2 event configuration of the second RAT from the network again. In operation 850, the terminal 120 may be configured to identify whether the timer T has expired in case that the TTT has expired. When the timer T has not expired, the terminal 120 may return to operation 810 and identify again whether the signal strength of the serving cell is higher than the threshold of the A2 event. When the timer T has expired, the terminal 120 may be configured not to perform handover.

Figure 9:
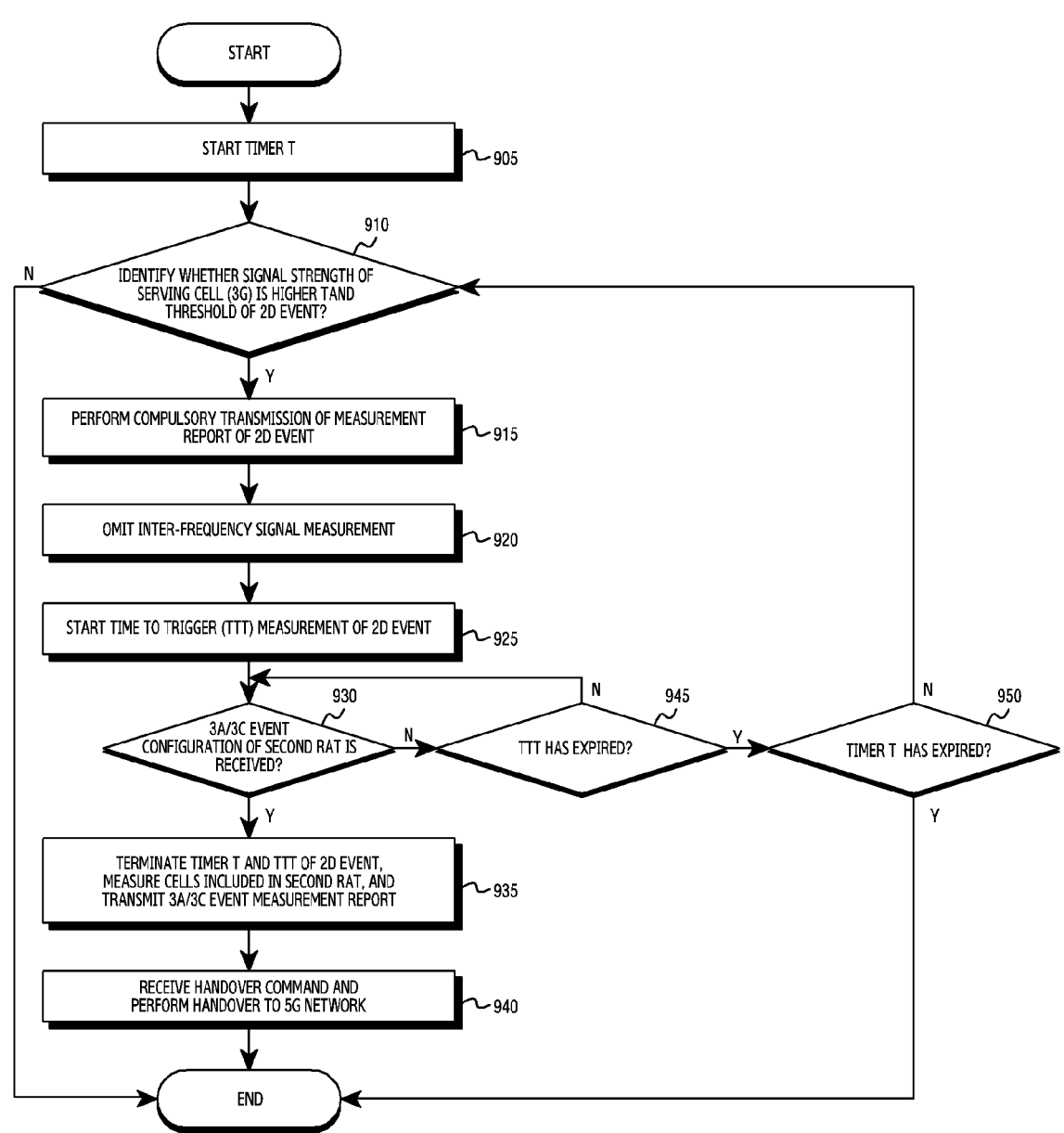
FIG. 9 illustrates an embodiment of an active handover procedure according to various example embodiments.

FIG. 9 illustrates an embodiment of an active handover procedure according to various example embodiments.

Hereinafter, contents overlapping with those described in FIG. 7 will be briefly described.

Referring to FIG. 9, an active handover procedure from a second RAT (e.g., 3G network) to a first RAT (e.g., 5G network) may be described. Hereinafter, in case that a measurement report triggering event (e.g., 2d, 3a, or 3c event) is satisfied in the active handover procedure, the terminal 120 may transmit a measurement report. Here, the 2d event may correspond to a measurement report triggering event in an inter-frequency handover procedure. The 2d event may be an event reported when the signal strength of a serving cell is equal to or less than a threshold. The 3a to 3c events may correspond to measurement report triggering events in an inter-RAT handover procedure. The 3a event may be an event reported when the signal strength of a serving RAT is equal to or less than a first threshold and the signal strength of a neighbor RAT is equal to or greater than a second threshold. The 3c event may be an event reported when the signal strength of a neighbor RAT is equal to or greater than a threshold.

In operation 905, the terminal 120 may start a timer T. In operation 910, the terminal 120 may be configured to identify whether the signal strength of a serving cell is higher than a threshold of the 2d event. The terminal 120 may be configured not to perform active handover when the signal strength of the serving cell is lower than the threshold of the 2d event. In operation 915, when the signal strength of the serving cell is higher than the threshold of the 2d event, the terminal 120 may transmit a measurement report of the 2d event together with a modified signal of the serving cell to the network. In operation 920, the terminal 120 may omit inter-frequency signal measurement.

In operation 925, the terminal 120 may a start time to trigger (TTT) measurement of the 2d event. In operation 930, the network may transmit 3a or 3c event configuration of the second RAT to the terminal 120. The terminal 120 may receive the 3a or 3c event configuration of the second RAT from the network. In operation 935, in the case of receiving the 3a or 3c event configuration of the second RAT, the terminal 120 may terminate the timer T and TTT measurement of the 2d event. The terminal 120 may measure cells included in the second RAT. In addition, the terminal 120 may transmit a modified signal of the serving cell and a measurement report of the 3a or 3c event to the network. The network may receive the modified signal of the serving cell and the measurement report of the 3a or 3c event from the terminal 120. In operation 940, the network may transmit a handover command to the terminal 120. The terminal 120 may receive a handover command from the network and perform handover to the first RAT according to the handover command.

In operation 945, in the case of not receiving the 3a or 3c event configuration of the second RAT from the network, the terminal 120 may be configured to identify whether the TTT has expired. When the TTT has not expired, the terminal 120 may return to operation 930 and receive the 3a or 3c event configuration of the second RAT from the network again. In operation 950, the terminal 120 may be configured to identify whether the timer T has expired in case that the TTT has expired. When the timer T has not expired, the terminal 120 may return to operation 910 and identify again whether the signal strength of the serving cell is higher than the threshold of the 2d event. When the timer T has expired, the terminal 120 may be configured not to perform handover. The terminal 120 may perform handover to the 4G network through the above operations (e.g., operations 905 to 950), and may handover to the 5G network through the above-described operations of FIG. 8 (e.g., operations 805 to 850) after handing over to the 4G network.

Figure 10:
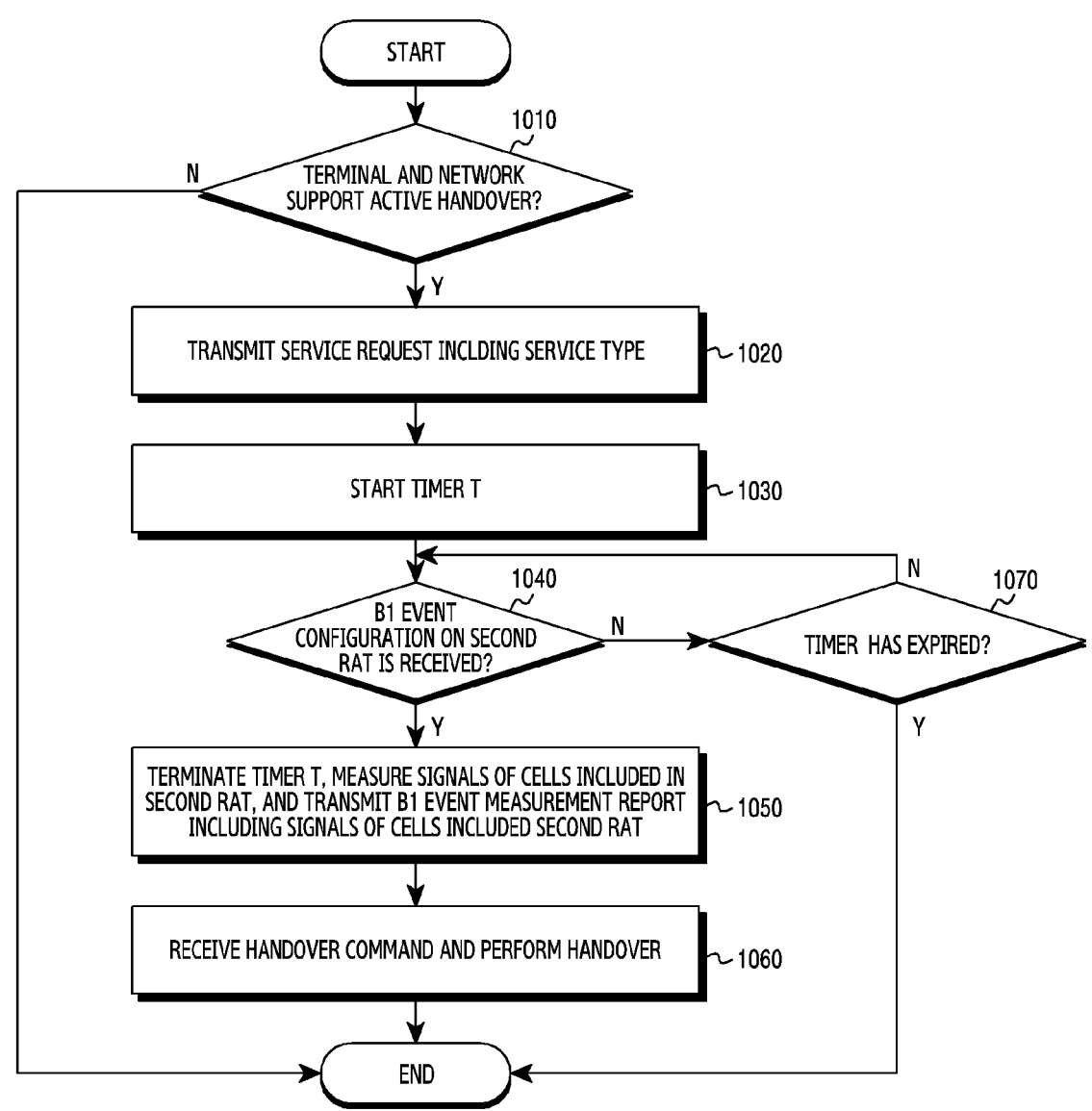
FIG. 10 illustrates an embodiment of an active handover procedure according to various example embodiments.

FIG. 10 illustrates an embodiment of an active handover procedure according to various example embodiments.

Referring to FIG. 10, an active handover procedure from a first RAT (e.g., 5G network) to a second RAT (e.g., 3G or 4G network) may be described. In operation 1010, the terminal 120 may be configured to identify whether the terminal 120 and the network support active handover. The terminal 120 may notify the network of whether the terminal 120 supports active handover by transmitting a message including active handover support information (e.g., a UE capability report) to the network. The network may notify the terminal 120 of whether active handover is supported through higher layer signaling (e.g., an RRA message). The terminal 120 may be configured not to perform an active handover procedure when the terminal and the network do not support active handover.

In operation 1020, when the terminal and the network support active handover, the terminal 120 may transmit service request including a service type (e.g., SMS fallback or USSD fallback) to the network. When the terminal and the network support active handover, the network may receive a service request including service type from the terminal 120.

In operation 1030, the terminal 120 may start a timer T. In operation 1040, the network may transmit B1 event configuration of the second RAT to the terminal 120. The terminal 120 may receive B1 event configuration of the second RAT from the network.

In operation 1050, when the terminal 120 has received B1 event configuration of the second RAT from the network, the timer T measurement may be terminated. The terminal 120 may measure cells included in the second RAT. In addition, the terminal 120 may transmit a modified signal of a serving cell and a measurement report of the B1 or B2 event to the network. The network may receive a modified signal of the serving cell and a measurement report of the B1 or B2 event from the terminal 120.

In operation 1060, the network may transmit a handover command to the terminal 120. The terminal 120 may receive a handover command from the network and perform handover to the second RAT according to the handover command.

In operation 1070, in the case of not receiving the B1 event configuration of the second RAT from the network, the terminal 120 may identify whether the timer T has expired. When the timer T has not expired, the terminal 120 may return to operation 1040 and receive the B1 event configuration of the second RAT from the network again. When the timer T has expired, the terminal 120 may not perform handover. According to the above-described embodiment, the terminal 120 may be configured not to perform a procedure for identifying and selecting a second RAT capable of supporting the requested service.

Figure 11:
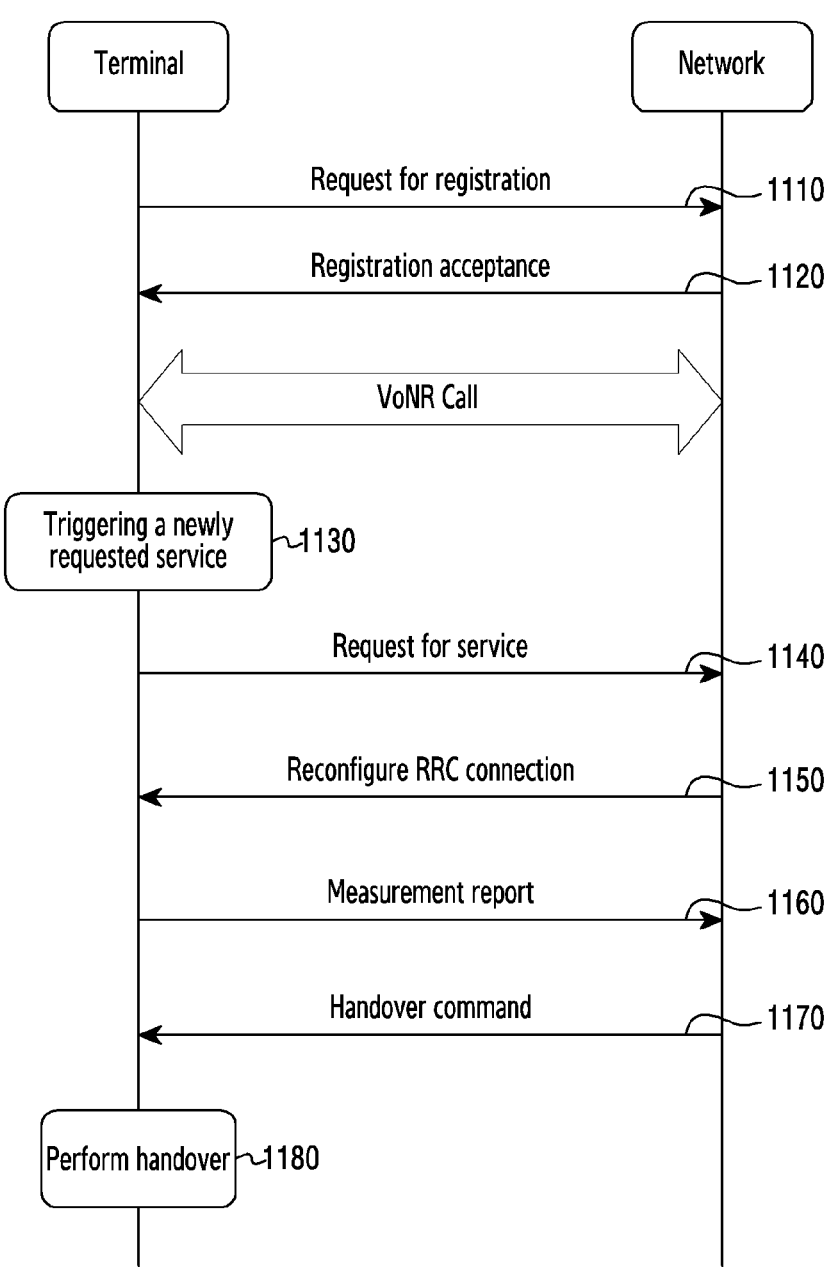
FIG. 11 illustrates an embodiment illustrating a signal flow in a handover procedure according to various example embodiments.

FIG. 11 illustrates an embodiment illustrating a signal flow in a handover procedure according to various example embodiments.

Hereinafter, contents overlapping with those described in FIG. 10 will be briefly described.

Referring to FIG. 11, the flow of signals in the active handover procedure between the terminal 120 and the network according to the embodiment of FIG. 10 may be described. In operation 1110, the terminal 120 may transmit a registration request message to the network. The registration request message may include information indicating whether a UE capability supports active handover. The network may receive a registration request message from the terminal 120.

In operation 1120, the network may transmit a registration acceptance message to the terminal 120 in response to the registration request message having received from the terminal 120. The registration accept message may include information indicating whether a network capability supports active handover. The terminal 120 may receive a registration acceptance message from the network. In operation 1130, the terminal 120 may perform a VoNR service, and a newly requested service may be triggered while the VoNR service is being performed.

In operation 1140, the terminal 120 may transmit a service request message to the network. The network may receive a service request message from the terminal 120. The service request message may include service type (e.g., SMS fallback or USSD fallback) for a newly requested service.

In operation 1150, the network may transmit an RRC connection reconfiguration message to the terminal 120. The terminal 120 may receive an RRC connection reconfiguration message from the network. The RRC connection reconfiguration message may include B1 event configuration of the second RAT.

In operation 1160, the terminal 120 may transmit a measurement report (e.g., B1 event measurement report) to the network. The network may receive a measurement report from the terminal 120. The network having received the measurement report may transmit a handover command to the terminal 120. The terminal 120 may receive a handover command from the network. In operation 1180, upon receiving the handover command, the terminal 120 may perform handover to the second RAT according to the handover command.

Figure 12:
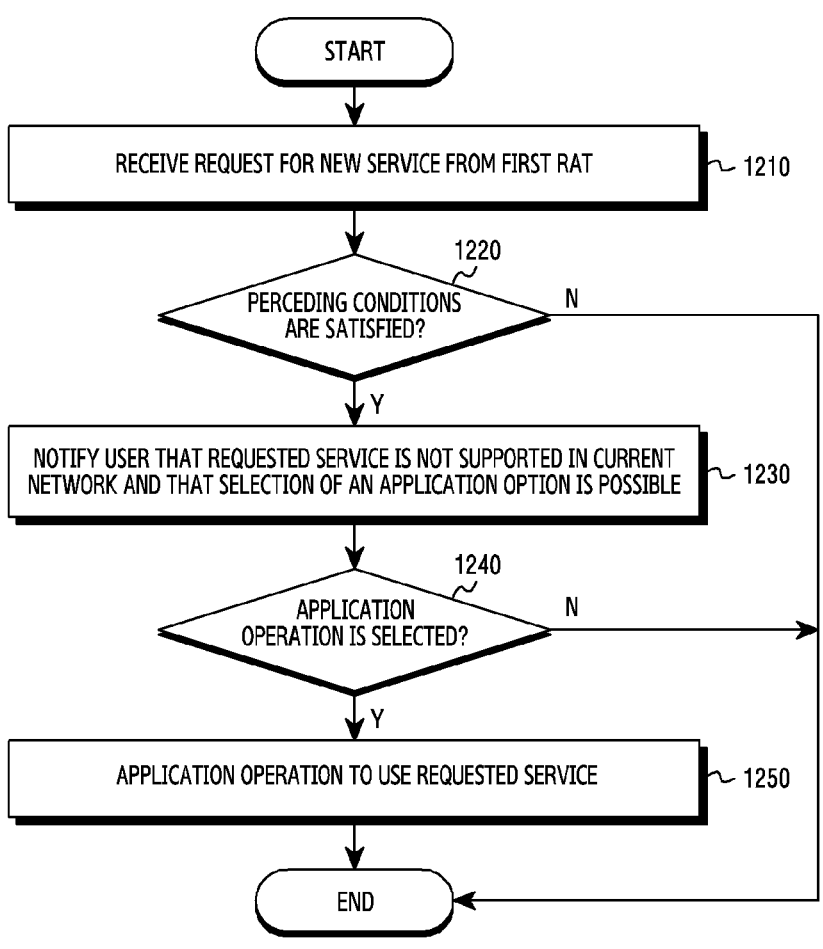
FIG. 12 illustrates an embodiment of a handover procedure according to various example embodiments.

FIG. 12 illustrates an embodiment of a handover procedure according to various example embodiments.

Referring to FIG. 12, a procedure for allowing the terminal 120 to provide a newly requested service through an application will be described. In operation 1210, the terminal 120 may receive a service request from the first RAT. In operation 1220, the terminal 120 may be configured to identify whether the preceding conditions are satisfied. Preceding conditions will be described in detail with reference to FIG. 13 below.

In operation 1230, in case that the preceding conditions are satisfied, the terminal 120 may notify a user that the requested service is not supported in the current network and that selection of an application operation option is possible. The terminal 120 may be configured to identify an application (e.g., com.myviettel.xyx) capable of supporting the requested service from a database including service support information. Service support information including application information may include one or more of service name, application name, and information indicating supported or not, and may be represented as shown in Table 2 below.

TABLE 2

| | Service name | Application name | Supported or not |
|---|---|---|---|
| MCC/MNC | USSD | com.myviettel.xyx | Y |
| | SMS | x | N |

If the preceding conditions are not satisfied, the terminal 120 may end the procedure for providing the requested service.

In operation 1240, the terminal 120 may obtain a user's selection of an application operation option. In operation 1250, when the user selects the application operation, the terminal 120 may operate the application to use the requested service. However, when the user does not select an application operation, the terminal 120 may end the procedure for providing the requested service. In the above procedure, the application is just one example, and may refer to software capable of operating in the terminal 120, and is not limited to a specific application.

Figure 13:
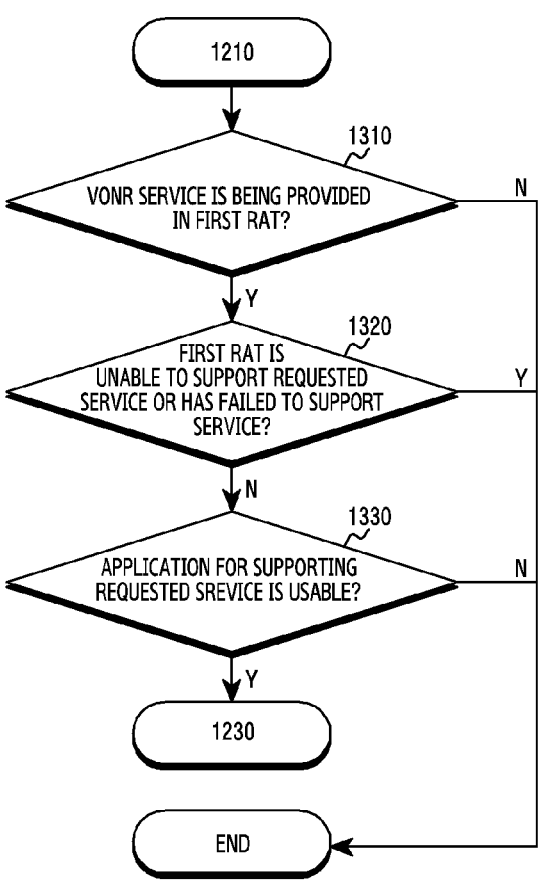
FIG. 13 illustrates a preceding condition identifying operation of FIG. 12 in a handover procedure according to various example embodiments.

FIG. 13 illustrates a preceding condition identifying operation of FIG. 12 in a handover procedure according to various example embodiments.

Referring to FIG. 13, an operation in which a terminal 120 identifies a preceding condition in a procedure of providing a newly requested service through an application may be described.

In operation 1310, the terminal 120 may be configured to identify whether the VoNR service is being provided in the first RAT. When the VoNR service is not being provided in the first RAT, the terminal 120 may end a procedure for providing the requested service.

In operation 1320, when the VoNR service is being provided in the first RAT, the terminal 120 may be configured to identify whether the first RAT supports the requested service. When the first RAT supports the requested service, the terminal 120 may end a procedure for providing the requested service.

In operation 1330, in case that the first RAT does not support the requested service or fails to support the service, the terminal 120 may be configured to identify whether an application supporting the requested service is usable. When the terminal 120 is able to use an application supporting the requested service, the terminal 120 may perform the above-described procedures of operation 1230 or below. When the terminal 120 is unable to use an application supporting the requested service, the terminal 120 may end a procedure for providing the requested service.

Figure 14:
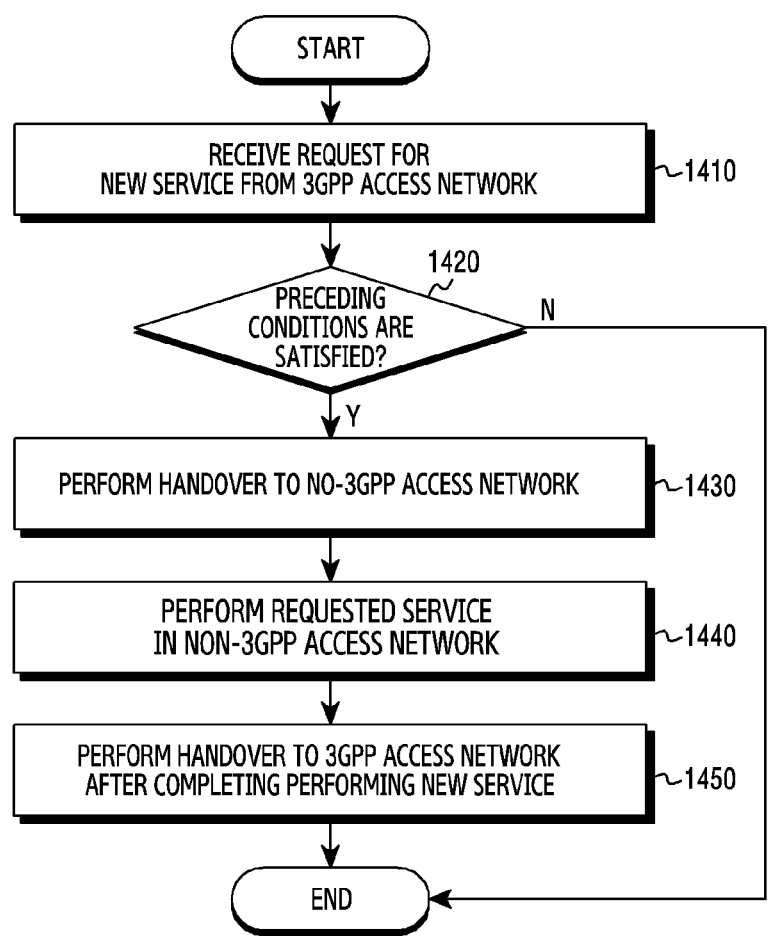
FIG. 14 illustrates an embodiment of a signal flow in a handover procedure according to various example embodiments.

FIG. 14 illustrates an embodiment of a signal flow in a handover procedure according to various example embodiments.

Referring to FIG. 14, a procedure of handover to a non-3rd generation partnership project access network (3GPP access network) for the terminal 120 to perform a newly requested service may be described. In operation 1410, the terminal 120 may receive a service request from the 3GPP access network. In operation 1420, the terminal 120 may be configured to identify whether the preceding conditions are satisfied. The preceding conditions are described in detail with reference to FIG. 15 below.

In operation 1430, in case that the preceding conditions are satisfied, the terminal 120 may perform handover to the non-3GPP access network. In case that the preceding conditions are not satisfied, the terminal 120 may end the procedure for providing the requested service. In operation 1440, the terminal 120 may perform the requested service in the non-3GPP access network. In operation 1450, the terminal 120 may perform handover to the 3GPP access network after completing performing the requested service.

Figure 15:
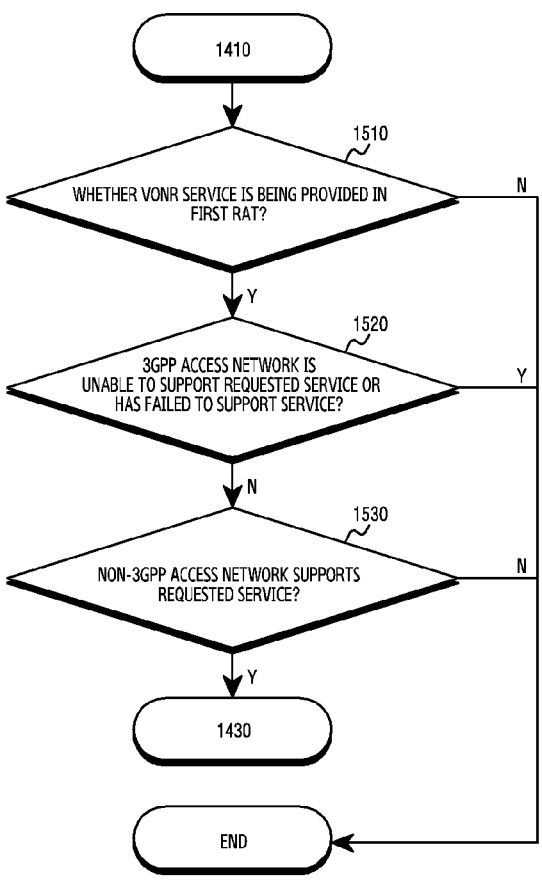
FIG. 15 illustrates a preceding condition identifying operation of FIG. 14 in a handover procedure according to various example embodiments.

FIG. 15 illustrates a precondition identifying operation of FIG. 14 in a handover procedure according to various example embodiments.

Referring to FIG. 15, an operation of identifying a preceding condition in a procedure of handover to a non-3GPP access network for the terminal 120 to provide a requested service may be described.

In operation 1510, the terminal 120 may be configured to identify whether the VoNR service is being provided in the first RAT. When the VoNR service is not being provided in the first RAT, the terminal 120 may end a procedure for providing the requested service.

In operation 1520, when the VoNR service is being provided in the first RAT, the terminal 120 may be configured to identify whether a currently connected network (e.g., a 3GPP access network) is able to support the requested service based on a database including service support information. The service support information may include information on whether or not a service is supported according to an access type, and may be represented as shown in Table 3 below. When the 3GPP access network supports the requested service, the terminal 120 may end a procedure for providing the requested service.

TABLE 3

| | Access type | | USSD | |
|---|---|---|---|---|
| MCC/MNC | 3GPP access | | NAS | Over IP |
| | | | N | N |
| | | | N | N |
| | | | N | N |
| | | | N | N |
| | Non- 3GPP access | WIFI | | Y |
| | | CDMA | | Y |

In operation 1530, in case that the 3GPP access network does not support the requested service or fails to support the service, the terminal 120 may be configured to identify whether the non-3GPP access network supports the requested service. In case that the non-3GPP access network is able to support the requested service, the terminal 120 may perform the above-described procedures of operation 1430 or below. When the non-3GPP access network is unable to support the requested service, the UE 120 may end a procedure for providing the requested service.

Figure 16:
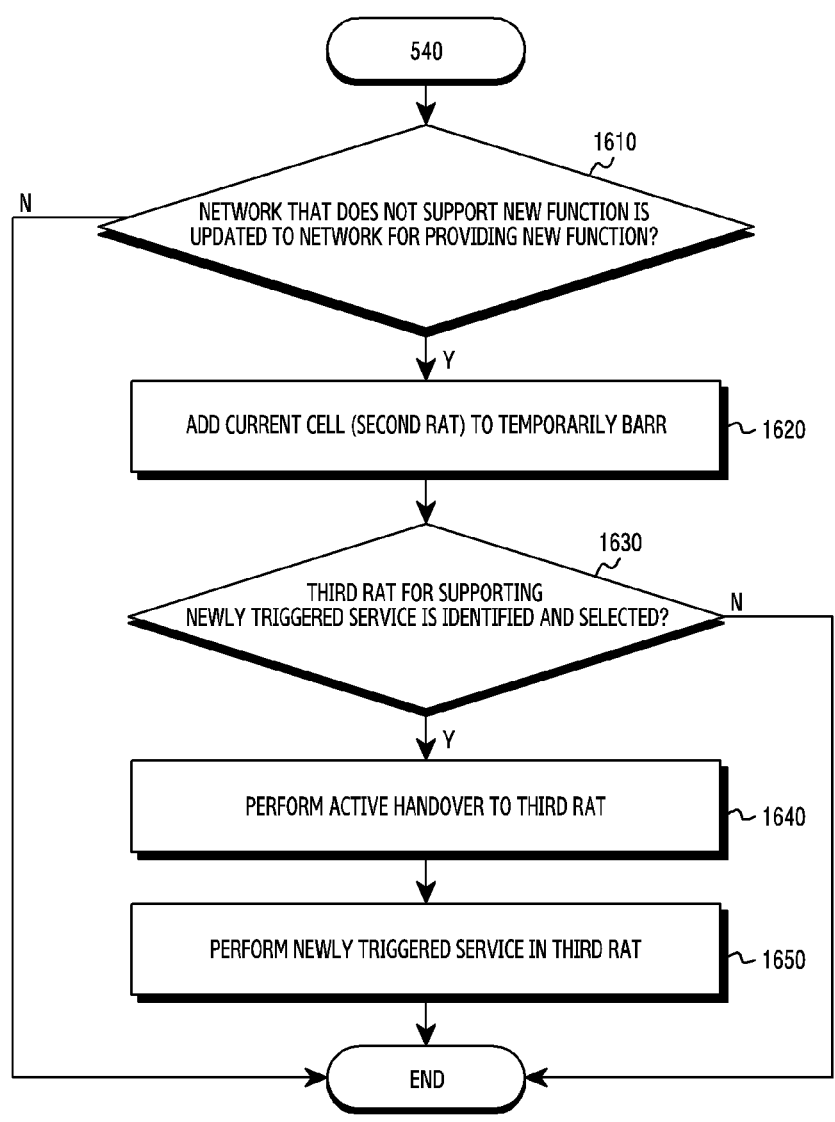
FIG. 16 illustrates an embodiment of a handover procedure according to various example embodiments.

FIG. 16 illustrates an embodiment of a handover procedure according to various example embodiments.

Referring to FIG. 16, an operation of performing handover to a third RAT for supporting a newly requested service in case that a second RAT to which the terminal 120 performs handover does not support the requested service may be described. In operation 1610, when the second RAT to which the terminal performs handover does not support the requested service, the terminal 120 may be configured to identify whether a database network (e.g., the second RAT) is able to be updated to a network (e.g., the third RAT) for providing the requested service function in a registration procedure.

In operation 1620, when network update is not possible, the terminal 120 may perform handover to the first RAT again (e.g., operation 570). In case that network update is possible, the terminal 120 may add the second RAT to a temporarily barred service. Temporarily barred service information may include one or more of public land mobile network (PLMN), absolute radio frequency channel number (Arfcn) cell ID, service name, and barred time remain information, and may be represented as shown in Table 4 below.

TABLE 4

| PLMN | RAT | Arfcn | Cell ID | Service name | Barred time remain (m) |
|---|---|---|---|---|---|
| 45206 | 4G | 1300 | 1 | SMS | 12 |
| 45206 | 4G | 1300 | 2 | USSD | 1 |
| 45206 | 4G | 1300 | 3 | USSD | 2 |

The terminal 120 may add current cell information to temporarily barred service information whenever receiving service support information that does not match the current database. The terminal 120 may be configured not to transmit a measurement report for a cell included in the temporarily barred service information while performing an active handover procedure. The terminal 120 may lower the occurrence frequency of ping-pong handovers by using the temporarily barred service information.

In operation 1630, the terminal 120 may be configured to identify and select a third RAT for supporting a newly triggered service from the database. In operation 1640, when there is no third RAT capable of providing the requested service, the terminal 120 may perform handover to the first RAT again (e.g., operation 570). In case that there is a third RAT capable of providing the requested service, the terminal 120 may perform active handover to the selected third RAT. In operation 1650, the terminal 120 may perform a newly triggered service in the third RAT.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various example embodiments as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed example embodiments, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The example embodiments described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, an embodiment of the disclosure may be partially combined with another embodiment to operate a base station and a terminal. As an example, embodiments 1 and 2 of the disclosure may be partially combined to operate a base station and a terminal. Moreover, although the above embodiments have been described based on the FDD LTE system, other variants based on the technical idea of the embodiments may be implemented in other systems such as TDD LTE and 5G or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in the methods of the disclosure, some or all of the contents of each embodiment may be combined without departing from the essential spirit and scope of the disclosure.

Various example embodiments have been described above. The above description of the disclosure is for the sake of illustration, and example embodiments are not limited to the embodiments set forth herein. Those skilled in the art will appreciate that they may be easily modified into other particular forms without changing the technical idea or essential features of the disclosure. The scope of the disclosure should be determined not by the above detailed description but by the appended claims, and all changes and modifications derived from the meaning and scope and equivalent concepts thereof shall be construed as falling within the scope of the disclosure.

As described above, a method for operating a terminal in a wireless communication system according to various example embodiments may include receiving a request for a second service by the terminal performing a first service in a first radio access technology (RAT), identifying one or more RATs capable of supporting the second service from a database including service support information in case that the first RAT is unable to perform the second service, performing handover to a second RAT included in the one or more RATs, and performing the second service in the second RAT.

According to various example embodiments, the database may include information about the priority of the one or more RATs, and the priority is determined based on one of information preconfigured in the terminal or information of one or more RATs connected to the first RAT before.

According to various example embodiments, the method may further include converting the first service to a service supported by the second RAT, and performing handover to the first RAT after the second service is performed.

According to various example embodiments, the identifying of the one or more RATs capable of supporting the second service may include receiving a user's selection regarding whether or not to perform a handover to a second RAT included in the one or more RATs.

The method may further include, in case that the user's selection corresponds to performing handover, performing triggering of handover to the second RAT.

According to various example embodiments, the performing handover to the second RAT may include transmitting a measurement report to a network in case that a signal strength of a serving cell is higher than a threshold of an A2 event, receiving a configuration for one of a B1 or a B2 event of the second RAT from the network, transmitting a measurement report for the second RAT to the network, and receiving a handover command from the network.

Each embodiment herein may be used in combination with any other embodiment(s) described herein.

According to various example embodiments, the performing handover to the second RAT may include transmitting a measurement report to a network in case that a signal strength of a serving cell is higher than a threshold of a 2d event, receiving, from the network, a configuration for one of a 3a or a 3c event of the second RAT, transmitting a measurement report for the second RAT to the network, and receiving a handover command from the network.

According to various example embodiments, the performing of the second service in the second RAT may include updating the database in case that the second RAT is unable to support the second service, identifying a third RAT capable of supporting the second service from the database, performing handover to the third RAT, and performing the second service in the third RAT.

According to various example embodiments, the first RAT is a 5G standalone (SA) network, the second RAT is either a 3G or 4G network, the first service is voice over new radio (VoNR), and the second service is either unstructured supplementary services data (USSD) or short message service (SMS).

According to various example embodiments, the first RAT is a 3rd generation partnership project (3GPP) access network, the second RAT is a non-3GPP access network, the first service is VoNR, and the second service is either USSD or SMS.

As described above, a terminal in a wireless communication system according to various example embodiments may include a communication unit (e.g., transceiver comprising communication circuitry), a memory, and a controller such as at least one processor comprising processing circuitry, wherein the controller is configured to perform control to receive a request for a second service by the terminal performing a first service in a first radio access technology (RAT), identify one or more RATs capable of supporting the second service from a database including service support information in case that the first RAT is unable to perform the second service, perform handover to a second RAT included in the one or more RATs, and perform the second service in the second RAT.

According to various example embodiments, the database may include information about the priority of the one or more RATs, and the priority is determined based on one of information preconfigured in the terminal or information of one or more RATs connected, directly or indirectly, to the first RAT before.

According to various example embodiments, the controller may be configured to perform control to convert the first service to a service supported by the second RAT, and perform handover to the first RAT after the second service is performed.

According to various example embodiments, the controller may be configured to perform control to receive a user's selection regarding whether or not to perform a handover to a second RAT included in the one or more RATs, and in case that the user's selection corresponds to performing handover, perform triggering of handover to the second RAT.

According to various example embodiments, the controller may be configured to perform control to transmit a measurement report to a network in case that a signal strength of a serving cell is higher than a threshold of an A2 event, receive a configuration for one of a B1 or a B2 event of the second RAT from the network, transmit a measurement report for the second RAT to the network, and receive a handover command from the network.

According to various example embodiments, the controller may be configured to perform control to transmit a measurement report to a network in case that a signal strength of a serving cell is higher than a threshold of a 2d event, receive, from the network, a configuration for one of a 3a or a 3c event of the second RAT, transmit a measurement report for the second RAT to the network, and receive a handover command from the network.

According to various example embodiments, the controller may be configured to perform control to update the database in case that the second RAT is unable to support the second service, identify a third RAT capable of supporting the second service from the database, perform handover to the third RAT, and perform the second service in the third RAT.

According to various example embodiments, the first RAT is a 5G standalone (SA) network, the second RAT is either a 3G or 4G network, the first service is voice over new radio (VoNR), and the second service may be either unstructured supplementary services data (USSD) or short message service (SMS).

According to various example embodiments, the first RAT is a 3rd generation partnership project (3GPP) access network, the second RAT is a non-3GPP access network, the first service is VoNR, and the second service may be either USSD or SMS.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a user equipment (UE) in a wireless communication system, the method comprising:
  receiving, by the UE providing a first service including a voice over new radio (VoNR) in a first radio access technology (RAT), a request for a second service including an unstructured supplementary service data (USSD) or a short message service (SMS);
  determining at least one RAT capable of supporting the second service and a voice call service based on a database of the UE including service support information in case that the second service is unable to be performed on the first RAT;
  performing handover to a second RAT among the at least one RAT; and
  performing the second service in the second RAT,
  wherein the first RAT is a fifth generation (5G) standalone (SA) network or a 3rd generation partnership project (3GPP) access network, and
  wherein the second RAT providing the voice call service is either a third generation (3G) network, a fourth generation (4G) network, or a non-3GPP access network,
  wherein the service support information for at least one RAT includes priority information and at least one of a mobile country code (MCC), a mobile network code (MNC), a service name, or a domain including a network access server (NAS) and an over-Internet protocol (IP),
  wherein the second RAT among the at least one RAT is determined based on the priority information, and
  wherein the priority information is based on at least one of information preconfigured in the UE or information of at least one RAT previously connected to the first RAT.

2. The method of claim 1, wherein the database is updated based on information periodically received from a base station or a request of the UE.

3. The method of claim 1, further comprising:
  converting the first service to a service supported by the second RAT; and
  performing handover to the first RAT after the second service is performed.

4. The method of claim 1, wherein the determining of the at least one RAT capable of supporting the second service and the voice call service comprises:
  receiving a user's selection regarding whether or not to perform a handover to the second RAT included in the at least one RAT; and
  in case that the user's selection corresponds to performing handover, performing triggering of handover to the second RAT.

5. The method of claim 1, wherein the performing handover to the second RAT comprises:
  transmitting a measurement report to a network in case that a signal strength of a serving cell is higher than a threshold of an A2 event;
  receiving a configuration for at least one of a B1 or a B2 event of the second RAT from the network;
  transmitting a measurement report for the second RAT to the network; and
  receiving a handover command from the network.

6. The method of claim 1, wherein the performing handover to the second RAT comprises:
  transmitting a measurement report to a network in case that a signal strength of a serving cell is higher than a threshold of a 2d event;
  receiving, from the network, a configuration for at least one of a 3a or a 3c event of the second RAT;
  transmitting a measurement report for the second RAT to the network; and
  receiving a handover command from the network.

7. The method of claim 1, wherein the performing of the second service in the second RAT comprises:

updating the database in case that the second RAT is unable to support the second service;

identifying a third RAT capable of supporting the second service from the database;

performing handover to the third RAT; and performing the second service in the third RAT.

8. A user equipment (UE) in a wireless communication system, the UE comprising:

a transceiver;

at least one processor; and memory storing instructions that, when executed by the at least one processor, cause the UE to:

receive, by the UE providing a first service including a voice over new radio (VoNR) in a first radio access technology (RAT), a request for a second service including an unstructured supplementary service data (USSD) or a short message service (SMS);

identify at least one RAT capable of supporting the second service and a voice call service based on a database of the UE including service support information in case that the second service is unable to be performed on the first RAT;

perform handover to a second RAT among the at least one RAT; and perform the second service in the second RAT, wherein the first RAT is a fifth generation (5G) standalone (SA) network or a 3rd generation partnership project (3GPP) access network, and wherein the second RAT providing the voice call service is either a third generation (3G) network, a fourth generation (4G) network, or a non-3GPP access network, wherein the service support information for at least one RAT includes priority information and at least one of a mobile country code (MCC), a mobile network code (MNC), a service name, or a domain including a network access server (NAS) and an over-Internet protocol (IP), wherein the second RAT among the at least one RAT is determined based on the priority information, and wherein the priority information is based on at least one of information preconfigured in the UE or information of at least one RAT previously connected to the first RAT.

9. The UE of claim 8, wherein the database is updated based on information periodically received from a base station or a request of the UE.

10. The UE of claim 8, wherein the memory further comprises the instructions that, when executed by the at least one processor, cause the UE to:

convert the first service to a service supported by the second RAT, and perform handover to the first RAT after the second service is performed.

11. The UE of claim 8, wherein the memory further comprises the instructions that, when executed by the at least one processor, cause the UE to:

receive a user's selection regarding whether or not to perform a handover to the second RAT included in the at least one RAT, and in a case that the user's selection corresponds to performing handover, perform triggering of handover to the second RAT.

12. The UE of claim 8, wherein the memory further comprises the instructions that, when executed by the at least one processor, cause the UE to:

transmit a measurement report to a network in case that a signal strength of a serving cell is higher than a threshold of an A2 event, receive a configuration for at least one of a B1 or a B2 event of the second RAT from the network, transmit a measurement report for the second RAT to the network, and receive a handover command from the network.

13. The UE of claim 8, wherein the memory further comprises the instructions that, when executed by the at least one processor, cause the UE to:

transmit a measurement report to a network in case that a signal strength of a serving cell is higher than a threshold of a 2d event, receive, from the network, a configuration for at least one of a 3a or a 3c event of the second RAT, transmit a measurement report for the second RAT to the network, and receive a handover command from the network.

14. The UE of claim 8, wherein the memory further comprises the instructions that, when executed by the at least one processor, cause the UE to:

update the database in case that the second RAT is unable to support the second service, identify a third RAT capable of supporting the second service from the database, perform handover to the third RAT and perform the second service in the third RAT.

\* \* \* \* \*